W. J. FREW.
FUEL CUT-OFF FOR MOTOR VEHICLES.
APPLICATION FILED NOV. 14, 1916.
1,213,859.
Patented Jan. 30, 1917.
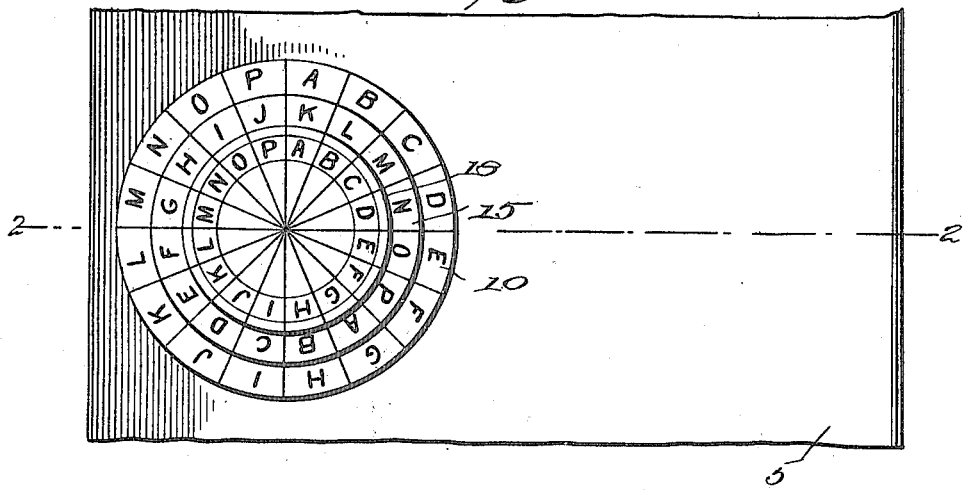
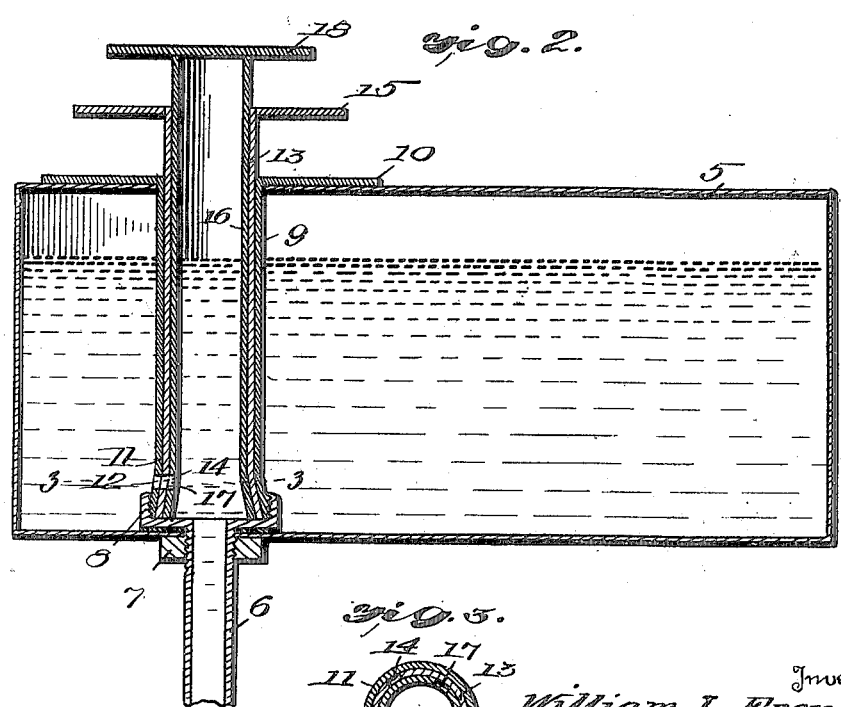
Inventor
William J. Frew
By
Attorneys

UNITED STATES PATENT OFFICE.

WILLIAM J. FREW, OF CHICAGO, ILLINOIS.

FUEL CUT-OFF FOR MOTOR-VEHICLES.

1,213,859.　　　　Specification of Letters Patent.　　Patented Jan. 30, 1917.

Application filed November 14, 1916.　Serial No. 131,262.

*To all whom it may concern:*

Be it known that I, WILLIAM J. FREW, a citizen of the United States, residing at Chicago, in the county of Cook and State of Illinois, have invented new and useful Improvements in Fuel Cut-Offs for Motor-Vehicles, of which the following is a specification.

This invention relates to gasolene and other liquid fuel storage tanks carried by motor vehicles, and its object is to provide a novel and improved closure for the outlet of such tanks so arranged that it may be locked for the purpose of shutting off the fuel supply of the engine and thus guarding against theft of the car or unauthorized use thereof.

In order that the invention may be better understood, reference is had to the accompanying drawing forming a part of this specification, and in said drawing Figure 1 is a plan view of the tank showing the application of the invention; Fig. 2 is a cross-section on the line 2—2 of Fig. 1, and Fig. 3 is a horizontal section on the line 3—3 of Fig. 2 showing the parts in position when the tank outlet is closed.

Referring specifically to the drawing, 5 denotes the tank or container in which the gasolene or other liquid fuel supply of a motor vehicle is carried. The bottom of the tank has an outlet connection 6 with the pipe leading to the carbureter or other charge forming device. This connection is a nipple passing through the bottom of the tank and secured by a lock nut 7 which is soldered to the tank bottom. Inside the tank, the nipple has a short extension 8 which is externally threaded to hold the lower end of a tube 9 positioned vertically in the tank and passing through the top thereof. The top of this tube has an outstanding annular flange 10 seating on the outside of the tank top and soldered or otherwise fixed thereto. The bottom of the tube is made flared or conical, as shown at 11, and said flared portion has a side port 12. In the tube 9 is rotatably mounted a tube 13 which is also flared at its lower end and has a side port 14. The upper end of the tube 13 rises for a short distance from the top of the tube 9 and has at said end an outstanding annular flange 15 concentric with and of smaller diameter than the flange 10. In the tube 13 is rotatably mounted a tube 16 which is also flared at its lower end and has a side port 17. The upper end of the tube 16 is closed and rises for a short distance from the top of the tube 13 and on said end is an outstanding annular flange 18 concentric with and of smaller diameter than the flange 10.

The ports 12, 14 and 17 are in the same plane, and hence when the tubes 13 and 16 are properly turned with respect to each other and to the tube 9, the ports register, and hence the fuel can escape from the tank through said ports into the innermost tube 16 and thence into the nipple 6, said tube being in communication with the nipple. Upon turning the tubes 13 and 16 so that the ports no longer register, the flow of fuel from the tank is shut off in an obvious manner.

The faces of the flanges 10, 15 and 18 are inscribed with lettered or other charactered graduations which must be combined in a certain order similar to a permutation lock before the ports are brought into registering position, the tubes 13 and 16 being rotated by grasping the flanges thereof. It will therefore be seen that the opening of the tank outlet would be attended with considerable difficulty without knowledge of the combination. It will be understood that when the person in charge of the car leaves the same, he will give the tubes 13 and 16 a short turn to close the outlet, and as the fuel supply is now shut off the car cannot be run for any appreciable distance, and the device therefore provides a simple and efficient safeguard against theft or unauthorized use of the car. The flared lower ends of the tubes have a ground joint so that there is no leakage past the same. The drawing illustrates three tubes, but it will be evident that a larger number of tubes may be provided. However, three tubes render the combination sufficiently complex for all practical purposes. The spacing of the flanges at the upper ends of the tube is such that the flanges of the rotatable tubes may be easily grasped for turning said tubes. By making the lower ends of the tubes flared as shown, the two rotatable tubes cannot be withdrawn from the outer tube, and as the latter is fixed in the tank, the device is securely held in place.

I claim:—

The combination with a liquid container having an outlet; of a tube in the container and provided with a side port, and a plurality of tubes rotatably mounted in the first-mentioned tube and projecting from the container, said rotatable tubes having side ports in the plane of the first-mentioned port, and the innermost tube being in communication with the container outlet, the inner ends of the rotatable tubes being flared for preventing withdrawal of the said tubes from the first-mentioned tube, said first-mentioned tube being fixed in the container.

In testimony whereof I affix my signature.

WILLIAM J. FREW.

Copies of this patent may be obtained for five cents each, by addressing the "Commissioner of Patents, Washington, D. C."